United States Patent
Davis et al.

(10) Patent No.: US 10,999,311 B2
(45) Date of Patent: May 4, 2021

(54) RISK SCORE GENERATION FOR ASSETS OF AN ENTERPRISE SYSTEM UTILIZING USER AUTHENTICATION ACTIVITY

(71) Applicant: EMC IP Holding Company LLC, Hopkinton, MA (US)

(72) Inventors: Sashka T. Davis, Vienna, VA (US); Zulfikar A. Ramzan, Saratoga, CA (US); Zohar Duchin, Brookline, MA (US); Gregory A. Gerber, Jr., Westerville, OH (US); Mark Gergely, Mt. Sinai, NY (US); Steve G. Schlarman, Shawnee, KS (US)

(73) Assignee: EMC IP Holding Company LLC, Hopkinton, MA (US)

( * ) Notice: Subject to any disclaimer, the term of this patent is extended or adjusted under 35 U.S.C. 154(b) by 357 days.

(21) Appl. No.: 16/263,246

(22) Filed: Jan. 31, 2019

(65) Prior Publication Data
US 2020/0252422 A1 Aug. 6, 2020

(51) Int. Cl.
*H04L 29/06* (2006.01)
*G06F 21/31* (2013.01)

(52) U.S. Cl.
CPC .......... *H04L 63/1433* (2013.01); *G06F 21/31* (2013.01); *H04L 63/102* (2013.01); *H04L 63/145* (2013.01); *H04L 63/20* (2013.01)

(58) Field of Classification Search
CPC . H04L 63/1433; H04L 63/102; H04L 63/145; H04L 63/20; G06F 21/31
See application file for complete search history.

(56) References Cited

U.S. PATENT DOCUMENTS

| 8,495,745 | B1 | 7/2013 | Schrecker et al. |
| 2008/0307525 | A1 | 12/2008 | Nickle |
| 2010/0153156 | A1 | 6/2010 | Guinta et al. |
| 2015/0310215 | A1 | 10/2015 | McBride et al. |

(Continued)

OTHER PUBLICATIONS

Santosh S. Vempala, "The Random Projection Method," Center for Discrete Mathematics and Theoretical Computer Science (DIMACS), Oct. 13, 2006, 48 pages.

(Continued)

*Primary Examiner* — Ali S Abyaneh
*Assistant Examiner* — Shu Chun Gao
(74) *Attorney, Agent, or Firm* — Ryan, Mason & Lewis, LLP

(57) ABSTRACT

A method includes obtaining information regarding authentication events for users accessing assets of an enterprise system. The method also includes determining a likelihood of a given asset of the enterprise system becoming compromised responsive to compromise of a given user of the enterprise system. The method further includes determining an importance of the given asset based at least in part on a criticality value associated with the given asset, and generating a risk score for the given asset based at least in part on the determined likelihood of the given asset becoming compromised responsive to compromise of the given user and the determined importance of the given asset. The method further includes identifying remedial actions to reduce the risk score for the given asset and implementing, prior to detecting compromise of the given user, at least one of the remedial actions to modify a configuration of the given asset.

20 Claims, 5 Drawing Sheets

(56) References Cited

U.S. PATENT DOCUMENTS

| | | |
|---|---|---|
| 2016/0248794 A1 | 8/2016 | Cam |
| 2018/0046796 A1* | 2/2018 | Wright .................... G06F 21/45 |
| 2020/0162497 A1* | 5/2020 | Iyer ..................... H04L 63/1433 |
| 2020/0257784 A1* | 8/2020 | Brannon ............. G06F 21/6245 |

OTHER PUBLICATIONS

V.D. Blondel et al., "Fast Unfolding of Communities in Large Networks," Journal of Statistical Mechanics: Theory and Experiment, Oct. 9, 2008, 12 pages, vol. 2008, No. 10.

T.G. Kolda et al., "Tensor Decompositions and Applications," Society for Industrial and Applied Mathematics (SIAM) Review, Aug. 2009, pp. 455-500, vol. 51, No. 3.

Béla Bollobás, "Modern Graph Theory," Graduate Texts in Mathematics, 1998, 4 pages, vol. 184.

Olle Häggström, "Finite Markov Chains and Algorithmic Applications," London Mathematical Society Student Texts, Jan. 2001, 125 pages.

Wade Shen, "Active Social Engineering Defense (ASED)," DARPA Information Innovation Office (DOD-DARPA-I2O), Nov. 9, 2017, 15 pages.

J. Leskovec et al., "Mining of Massive Datasets," Cambridge University Press, 2011, 513 pages.

DARPA, "Active Social Engineering Defense (ASED), Wade Shen/I2O," https://www.darpa.mil/attachments/ShenASED.pdf, Jul. 20, 2018, 15 pages.

\* cited by examiner

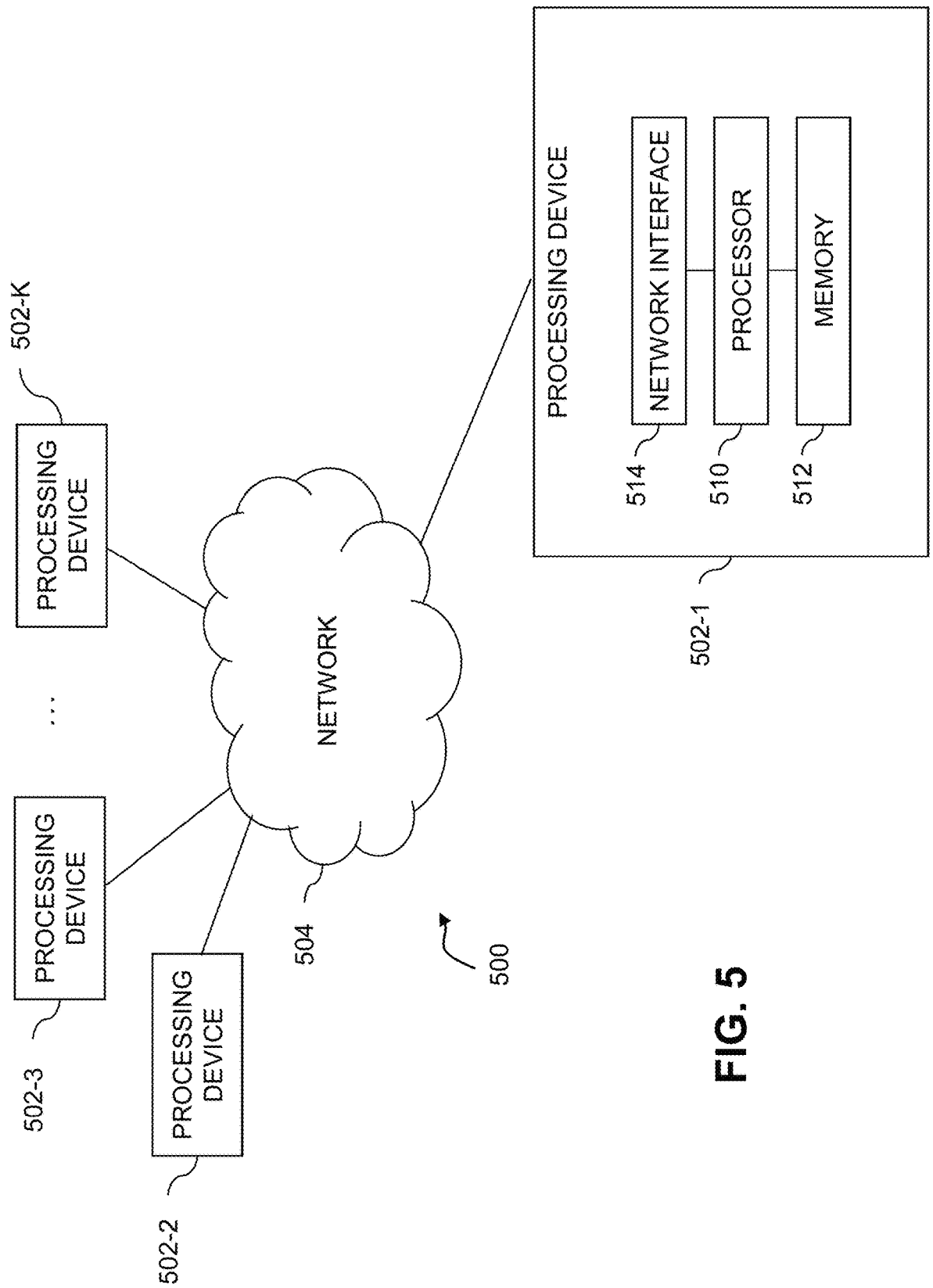

RISK SCORE GENERATION FOR ASSETS OF AN ENTERPRISE SYSTEM UTILIZING USER AUTHENTICATION ACTIVITY

FIELD

The field relates generally to information security, and more particularly to detection of security threats in computer networks.

BACKGROUND

Various entities are subject to different types of security threats. Some security threats relate to networking and computer security for client devices used by members of an entity, such as a business, organization or other enterprise. Security threats include, for example, compromise of users of the enterprise. Compromise of a particular user may present risks that expose one or more other users of the enterprise, as well as assets of an enterprise system. It is difficult to ascertain the risk of compromise of users in enterprise systems, particularly as the number of users and number of assets of an enterprise system grows. The task of monitoring an enterprise system for security threats or other issues thus presents various challenges.

SUMMARY

Illustrative embodiments of the present invention provide techniques for estimation of risk to an enterprise system based on user authentication events in the enterprise system. In some embodiments, the estimated risk may be used to automate actions in the enterprise system to proactively mitigate the risk of compromise of users and assets of the enterprise system.

In one embodiment, a method comprises obtaining information regarding a set of authentication events for an enterprise system, a given authentication event being associated with at least one of a plurality of users of the enterprise system accessing at least one of a plurality of assets of the enterprise system. The method also comprises determining a likelihood of a given one of the plurality of assets of the enterprise system becoming compromised responsive to compromise of a given one of the plurality of users of the enterprise system, the given asset comprising at least one of a physical computing resource and a virtual computing resource in the enterprise system. The method further comprises determining an importance of the given asset of the enterprise system based at least in part on a criticality value associated with the given asset.

The method further comprises generating a risk score for the given asset based at least in part on: (i) the determined likelihood of the given asset becoming compromised responsive to compromise of the given user; and (ii) the determined importance of the given asset. The method further comprises identifying one or more remedial actions to reduce the risk score for the given asset, and implementing, prior to detecting compromise of the given user, at least one of the remedial actions to modify a configuration of the given asset. The method is performed by at least one processing device comprising a processor coupled to a memory.

The processing device may be implemented, for example, in one or more network devices in a computer network, in a security operations center of an enterprise, or in a security analytics system or other type of network security system associated with the computer network or an enterprise.

These and other illustrative embodiments include, without limitation, methods, apparatus, networks, systems and processor-readable storage media.

BRIEF DESCRIPTION OF THE DRAWINGS

FIGS. 4 and 5 show examples of processing platforms that may be utilized to implement at least a portion of an information processing system in illustrative embodiments.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Many high-profile data breaches exhibit similar patterns. For example, user credentials may be stolen and techniques for harvesting additional credentials are used to horizontally scan an enterprise network. Successful traversal of the network results in unauthorized access to assets and resources of importance to the enterprise. In some embodiments, techniques are provided for reducing or mitigating the risk of such high-profile data breaches and other types of security threats for enterprise systems. Some embodiments utilize probabilistic techniques for estimating enterprise risk (e.g., the risk to an enterprise) based on: (1) user authentication events that define relations between two types of enterprise assets—the users and enterprise resources or assets (e.g., servers, computers, data, etc. that can be stolen and compromised); (2) analysis of the structure of an authentication graph induced by the observed user-resource relations to compute an estimate of the probability that a resource on the network can be compromised; and (3) estimating probabilistic enterprise and resource risk scores that depend on the probability of compromise of each asset, information about the criticality (e.g., importance) of each resource or asset to the enterprise system, and the temporal variation of the criticalities with respect to the enterprise system. Advantageously, some embodiments combine the analysis of an enterprise authentication graph with time-dependent asset important to derive individual resource and overall enterprise system risk measures.

Figure 1:
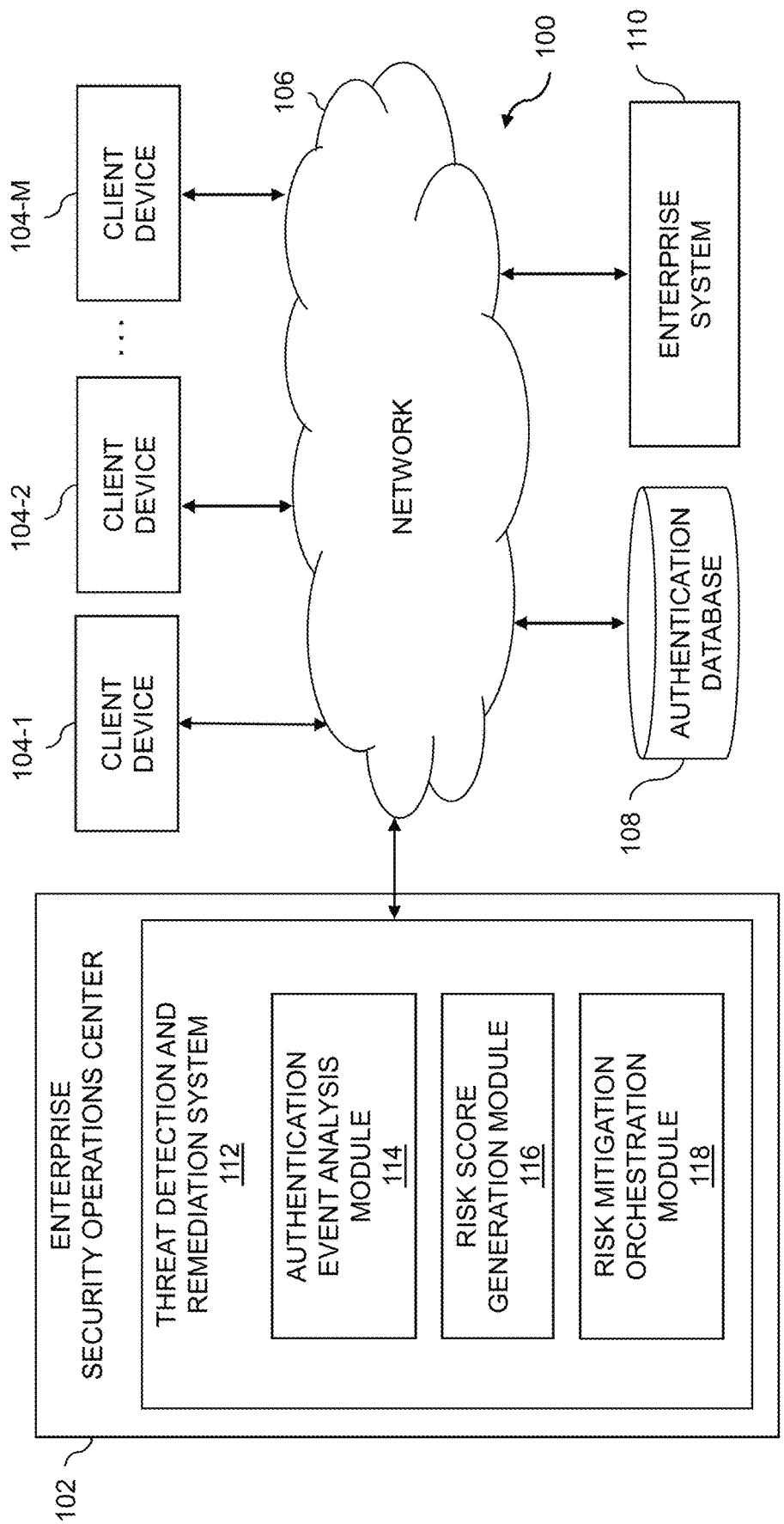
FIG. 1 is a block diagram of an information processing system for risk score generation for assets in an enterprise system utilizing user authentication activity in an illustrative embodiment of the invention.

FIG. 1 shows an information processing system 100 configured in accordance with an illustrative embodiment.

The information processing system 100 is assumed to be built on at least one processing platform and provides functionality for risk score generation for assets in an enterprise system 110 utilizing user authentication activities. The assets may include, by way of example, physical and virtual computing resources in the enterprise system 110. Physical computing resources may include physical hardware such as servers, storage systems, networking equipment, Internet of Things (IoT) devices, other types of processing and computing devices, etc. Virtual computing resources may include virtual machines (VMs), containers, etc.

In this embodiment, the system 100 more particularly comprises an enterprise security operations center (SOC) 102 and a plurality of client devices 104-1, 104-2, . . . 104-M, collectively referred to herein as client devices 104. The client devices 104 are coupled to a network 106. Also coupled to the network 106 is an authentication database 108, which may store various information relating to authentication events in the enterprise system 108.

The client devices 104 may comprise, for example, physical computing devices such as IoT devices, mobile telephones, laptop computers, tablet computers, desktop computers or other types of devices utilized by members of an enterprise, in any combination. Such devices are examples of what are more generally referred to herein as "processing devices." Some of these processing devices are also generally referred to herein as "computers." The client devices 104 may also or alternately comprise virtualized computing resources, such as VMs, containers, etc.

The client devices 104 in some embodiments comprise respective computers associated with a particular company, organization or other enterprise. In addition, at least portions of the system 100 may also be referred to herein as collectively comprising an "enterprise." Numerous other operating scenarios involving a wide variety of different types and arrangements of processing nodes are possible, as will be appreciated by those skilled in the art.

The network 106 is assumed to comprise a global computer network such as the Internet, although other types of networks can be part of the network 106, including a wide area network (WAN), a local area network (LAN), a satellite network, a telephone or cable network, a cellular network, a wireless network such as a WiFi or WiMAX network, or various portions or combinations of these and other types of networks.

The authentication database 108, as discussed above, is configured to store and record information relating to authentication events in the enterprise system 110. This may include, for example, authentication events in which users of the enterprise system 110 access assets of the enterprise system 110. In this context, accessing may include logging in to or otherwise authenticating to assets of the enterprise system 110, including utilizing entitlements and delegations to access assets of the enterprise system 110. The authentication database 108, in some embodiments, may also store information that is used to derive the probabilities of users accessing assets in the enterprise system 110. Such information may include metadata regarding the users, such as their role within an organizational structure of the enterprise system 110 (e.g., a business unit thereof), information about assets of the enterprise system 110 (e.g., associated business units, locations, etc.)

The authentication database 108 in some embodiments is implemented using one or more storage systems or devices associated with the enterprise SOC 102. In some embodiments, one or more of the storage systems utilized to implement the authentication database 108 comprises a scale-out all-flash content addressable storage array such as an XtremIO™ storage array from Dell EMC of Hopkinton, Mass. Other types of storage arrays, including by way of example VNX® and Symmetrix VMAX® storage arrays also from Dell EMC, can be used to implement a storage system in other embodiments.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays such as Unity™, software-defined storage products such as ScaleIO™ and ViPR®, cloud storage products such as Elastic Cloud Storage (ECS), object-based storage products such as Atmos®, and scale-out NAS clusters comprising Isilon® platform nodes and associated accelerators, all from Dell EMC. Combinations of multiple ones of these and other storage products can also be used in implementing a given storage system in an illustrative embodiment.

Although not explicitly shown in FIG. 1, one or more input-output devices such as keyboards, displays or other types of input-output devices may be used to support one or more user interfaces to the enterprise SOC 102, as well as to support communication between the enterprise SOC 102 and other related systems and devices not explicitly shown.

The client devices 104 are configured to access or otherwise utilize an enterprise system 110. The enterprise system 110 may represent an information technology (IT) infrastructure comprising a plurality of assets (e.g., physical or virtual computing resources) of a business, entity, organization or other enterprise.

In the present embodiment, alerts or notifications generated by a threat detection and remediation system 112 of the enterprise SOC 102 are provided over network 106 to client devices 104, or to a system administrator, information technology (IT) manager, or other authorized personnel via one or more security or host agents. Such security or host agents may be implemented via the client devices 104 or by other computing or processing devices associated with a system administrator, IT manager or other authorized personnel. Such devices can illustratively comprise mobile telephones, laptop computers, tablet computers, desktop computers, or other types of computers or processing devices configured for communication over network 106 with the enterprise SOC 102 and the threat detection and remediation system 112. For example, a given security or host agent may comprise a mobile telephone equipped with a mobile application configured to receive alerts from the enterprise SOC 102 or the threat detection and remediation system 112 and to provide an interface for the security agent to select particular remedial measures for responding to the alert or notification. Examples of such remedial measures may include blocking access by one or more of the client devices 104 to the enterprise system 110 or assets thereof, requiring user input or authentication by the client devices 104 to obtain information from or otherwise utilize one or more resources or assets of the enterprise system 110, triggering further review of the enterprise system 104 or resources or assets thereof, etc. Further examples of remedial measures or actions will be described below.

It should be noted that a "security agent" or "host agent" as these terms are generally used herein may comprise an automated entity, such as a software entity running on a processing device. Accordingly, a security agent or host agent need not be a human entity.

As shown in FIG. 1, the enterprise SOC 102 comprises threat detection and remediation system 112. As will be described in further detail below, the threat detection and remediation system 112 is configured to generate risk scores for assets in the enterprise system 110, where the risk score for a particular asset is based on: (i) its likelihood of becoming compromised assuming compromise of one or more users of the enterprise system 110; and (ii) that asset's criticality or importance to the operation of the enterprise system 110.

Although shown as an element of the enterprise SOC 102 in this embodiment, the threat detection and remediation system 112 in other embodiments can be implemented at least in part externally to the enterprise SOC 102, for example, as a stand-alone server, set of servers or other type of system coupled to the network 106. In some embodiments, the threat detection and remediation system 112 may be implemented at least in part within one or more of the client devices 104.

The threat detection and remediation system 112 in the FIG. 1 embodiment is assumed to be implemented using at least one processing device. Each such processing device generally comprises at least one processor and an associated memory, and implements one or more functional modules for controlling certain features of the threat detection and remediation system 112. In the FIG. 1 embodiment, the threat detection and remediation system 112 comprises an authentication event analysis module 114, a risk score generation module 116 and a risk mitigation orchestration module 118.

The authentication event analysis module 114 is configured to obtain information regarding a set of authentication events for the enterprise system 110 (e.g., from the authentication database 108, or via monitoring interactions between the client devices 104 and the enterprise system 110). Each authentication event is associated with at least one user of the enterprise system 110 (e.g., a user of a given one of the client devices 104) accessing at least one asset of the enterprise system 110. The authentication analysis module 114 is also configured to determine a likelihood of a given one of the plurality of assets of the enterprise system 110 becoming compromised responsive to compromise of a given one of the plurality of users of the enterprise system 110, and to determine an importance of the given asset of the enterprise system 110 based at least in part on a criticality value associated with the given asset.

The risk score generation module 116 is configured to generate a risk score for the given asset based at least in part on: (i) the determined likelihood of the given asset becoming compromised responsive to compromise of the given user; and (ii) the determined importance of the given asset. The risk mitigation orchestration module 118 is configured to identify one or more remedial actions to reduce the risk score for the given asset, and to implement, prior to detecting compromise of the given user, at least one of the remedial actions to modify a configuration of the given asset.

It is to be appreciated that the particular arrangement of the enterprise SOC 102, threat detection and remediation system 112, authentication event analysis module 114, risk score generation module 116 and risk mitigation orchestration module 118 illustrated in the FIG. 1 embodiment is presented by way of example only, and alternative arrangements can be used in other embodiments. As discussed above, for example, the enterprise SOC 102, threat detection and remediation system 112, authentication event analysis module 114, risk score generation module 116 and risk mitigation orchestration module 118 may in some embodiments be implemented internal to one or more of the client devices 104. As another example, the functionality associated with the authentication event analysis module 114, risk score generation module 116 and risk mitigation orchestration module 118 may be combined into one module, or separated across more than three modules with the multiple modules possibly being implemented with multiple distinct processors or processing devices.

At least portions of the authentication event analysis module 114, risk score generation module 116 and risk mitigation orchestration module 118 may be implemented at least in part in the form of software that is stored in memory and executed by a processor.

It is to be understood that the particular set of elements shown in FIG. 1 for risk score generation for assets of the enterprise system 110 utilizing authentication activity is presented by way of illustrative example only, and in other embodiments additional or alternative elements may be used. Thus, another embodiment may include additional or alternative systems, devices and other network entities, as well as different arrangements of modules and other components.

By way of example, in other embodiments, the threat detection and remediation system 112 may be implemented external to enterprise SOC 102, such that the enterprise SOC 102 can be eliminated.

In some embodiments, the threat detection and remediation system 112 may be part of or otherwise associated with a system other than the enterprise SOC 102, such as, for example, a critical incident response center (CIRC), a security analytics system, a security information and event management (SIEM) system, a Governance, Risk and Compliance (GRC) system, etc.

The threat detection and remediation system 112 and other portions of the system 100, as will be described in further detail below, may be part of cloud infrastructure such as an Amazon Web Services (AWS) system. Other examples of cloud-based systems that can be used to provide the threat detection and remediation system 112 include Virtustream Enterprise Cloud, Virtustream Storage Cloud, Google Cloud Platform (GCP) and Microsoft Azure.

The threat detection and remediation system 112 and other components of the information processing system 100 in the FIG. 1 embodiment are assumed to be implemented using at least one processing platform each comprising one or more processing devices each having a processor coupled to a memory. Such processing devices can illustratively include particular arrangements of compute, storage and network resources.

The client devices 104 and threat detection and remediation system 112 or components thereof (e.g., authentication event analysis module 114, risk score generation module 116 and risk mitigation orchestration module 118) may be implemented on respective distinct processing platforms, although numerous other arrangements are possible. For example, in some embodiments at least portions of the threat detection and remediation system 112 and one or more of the client devices 104 are implemented on the same processing platform. A given client device (e.g., 104-1) can therefore be implemented at least in part within at least one processing platform that implements at least a portion of the threat detection and remediation system 112.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the client devices 104, threat detection and remediation system 112 or portions or components thereof, to reside in different data centers. Numerous other distributed implementations are possible. The threat detection and remediation system 112 can also be implemented in a distributed manner across multiple data centers.

Additional examples of processing platforms utilized to implement threat detection and remediation system 112 in illustrative embodiments will be described in more detail below in conjunction with FIGS. 4 and 5.

It is to be appreciated that these and other features of illustrative embodiments are presented by way of example only, and should not be construed as limiting in any way.

An exemplary process for risk score generation for assets of an enterprise system utilizing authentication activity will now be described in more detail with reference to the flow diagram of FIG. 2. It is to be understood that this particular process is only an example, and that additional or alternative processes for risk score generation for assets of an enterprise system utilizing authentication activity can be carried out in other embodiments.

In this embodiment, the process includes steps 200 through 210. These steps are assumed to be performed by the threat detection and remediation system 112 utilizing the authentication event analysis module 114, risk score generation module 116 and risk mitigation orchestration module 118. The process begins with step 200, obtaining information regarding a set of authentication events for an enterprise system. Each of the authentication events is associated with at least one of a plurality of users of the enterprise system accessing at least one of a plurality of assets of the enterprise system. An authentication event may include authenticating at least one user (e.g., verifying the identity of the at least one user), authorizing access by the at least one user to at least one asset (e.g., verifying that an authenticated user has permission to access the at least one asset, such as using one or more entitlements and delegations, etc.). In some embodiments, step 200 includes deriving probabilities that a selected one of the plurality of users of the enterprise system will access a selected one of the plurality of assets of the enterprise system utilizing metadata associated with a placement of the selected user in an organizational structure of the enterprise system and metadata associated with a location of the selected asset of the enterprise system.

Step 200 may comprise generating an enterprise risk propagation graph (ERPG) comprising a bipartite graph with a first portion comprising a first plurality of nodes representing respective ones of the plurality of users of the enterprise system and a second portion comprising a second plurality of nodes representing respective ones of the plurality of assets of the enterprise system. The first and second pluralities of nodes are connected by a plurality of edges representing the obtained authentication events. Generating the ERPG may comprise constructing an undirected version of the bipartite graph with non-directional edges connecting the first plurality of nodes to the second plurality of nodes based on the obtained authentication events for the enterprise system, and performing a search on the undirected version of the bipartite graph to obtain a set of connected components connecting a given one of the first plurality of nodes representing the given user to a subset of the first and second pluralities of nodes. Performing the search may comprise performing a depth-first search (DFS) or a breadth-first search (BFS) on the undirected version of the bipartite graph to obtain the set of connected components for the given one of the first plurality of nodes representing the given user.

In step 202, a likelihood of a given one of the plurality of assets of the enterprise system becoming compromised responsive to compromise of a given one of the plurality of users of the enterprise system is determined. Determining the likelihood of the given asset becoming compromised responsive to compromise of the given user may comprise utilizing a random walk algorithm starting at a given one of the first plurality of nodes representing the given user and traversing a subset of the second plurality of nodes until a given one of the second plurality of nodes representing the given asset is reached. The random walk algorithm may utilize a decay factor that reduces a probability of reaching a selected one of the second plurality of nodes based on a number of edges of the ERPG traversed to reach the selected one of the second plurality of nodes from the given one of the first plurality of nodes.

The random walk algorithm may comprise converting an adjacency matrix of the ERPG to a probability transition matrix, wherein diagonal entries of the probability transition matrix are set to a predetermined value ensuring that a random walk of the ERPG is non-periodic and converges and wherein entries in each of the rows of the probability transition matrix are normalized to sum to one, and simulating the random walk of the ERPG utilizing a stationary distribution of the ERPG and the probability transition matrix. The stationary distribution may be computed utilizing a link analysis algorithm that assigns a numerical weighting to each of the plurality of edges of the ERPG. The numerical weighting assigned to a given one of the plurality of edges connecting to a selected one of the plurality of assets may be based at least in part on a determined vulnerability of the selected asset.

In some embodiments, the random walk algorithm utilizes an initial distribution of the ERPG comprising a uniform distribution of the first plurality of nodes with each of the second plurality of nodes being assigned a zero probability. In other embodiments, the random walk algorithm utilizes an initial distribution of the ERPG comprising a non-uniform distribution wherein a subset of the first plurality of nodes representing a subset of the plurality of users of the enterprise system is assigned non-zero probability and a remainder of the first plurality of nodes is assigned zero probability. The subset of the plurality of users of the enterprise system comprises a group of administrative users of the enterprise system. In some embodiments, the random walk algorithm utilizes an initial distribution of the ERPG comprising a non-uniform distribution of the second plurality of nodes wherein probabilities assigned to the second plurality of nodes are based on vulnerability assessments of the plurality of assets of the enterprise system.

Figure 2:
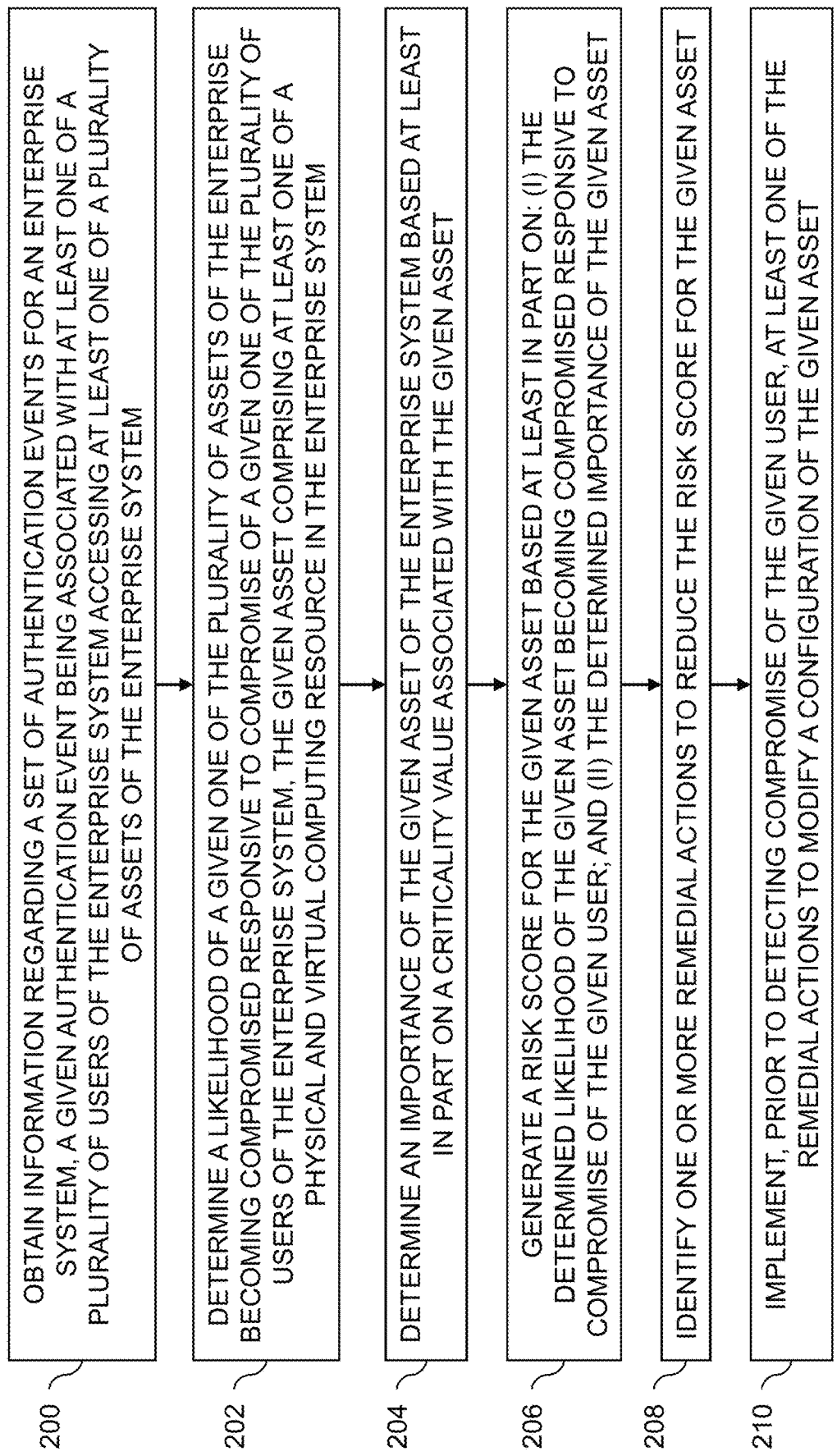
FIG. 2 is a flow diagram of an exemplary process for risk score generation for assets in an enterprise system utilizing user authentication activity in an illustrative embodiment.

The FIG. 2 process continues with step 204, determining an importance of the given asset of the enterprise system based at least in part on a criticality value associated with the given asset. The determined importance of the given asset may be further based at least in part on a temporal variability in the criticality of the given asset, where the temporal variability is determined based at least in part on a fraction of time within a designated time period that the given asset is assigned a given criticality value.

In step 206, a risk score for the given asset is generated based on the results of steps 202 (e.g., the determined likelihood of the given asset becoming compromised responsive to compromise of the given user) and 204 (the determined importance of the given asset). In some embodiments, step 206 may further include generating a risk score for the enterprise system based at least in part on the generated risk score for the given asset and one or more additional risk scores generated for additional ones of a plurality of assets of the enterprise system each generated based on a determined likelihood of that asset becoming compromised responsive to compromise of the given user and a determined importance of that asset to the enterprise system.

In step 208, one or more remedial actions to reduce the risk score for the given asset are identified. Prior to detecting compromise of the given user (e.g., proactively), at least one of the remedial actions identified in step 208 are implemented in step 210 to modify a configuration of the given asset. Various types of remedial actions may be taken, including actions that involve changing the configuration of assets in the enterprise system. Changing the configuration may include implementing or applying security hardening procedures, configuring security settings (e.g., firewalls, access permissions, etc.), installing additional or updated security software, implementing additional security checks, revoking or initiating a review of access privileges for the asset, requiring authentication or outside approval to access assets, etc. The risk scores for various assets in the enterprise system may also be utilized in conducting security or other audits of the enterprise system, to focus monitoring on critical assets with "high" risk scores, to guide the operation of other risk and compliance systems associated with the enterprise system, etc.

Remedial actions may fall into various categories, including manual actions, ticketing, automation, combinations thereof, etc. Manual remedial actions refer to remedial actions where various steps are performed manually by one or more users of the enterprise system (e.g., users associated with host or security agents as noted above). Ticketing remedial actions may be used with a workflow ticketing systems used to ensure that key tasks are handled as part of the response. Automated remedial actions can also be used. For example, if an asset is deemed to be high risk, additional security software can automatically be deployed onto that asset. In some cases, a workflow of remedial actions may be partially automated but still require some manual intervention for key areas. Such manual intervention may include, for example, a user approving an automated action via a security or host agent as described above.

It should be noted that a "high" risk score generally refers to a risk score above some designated threshold, which may be set by an operator or administrator of the enterprise system. The designated threshold may also be determined automatically, such as by considering the top X number of assets, or the top Y percentage of risk scores as being "high." As noted above, the risk score for a user considers not only propensity for compromise but also impact of compromise. The designated threshold may weigh propensity and impact as desired for a particular implementation. Risk scores for assets may also be ranked, and remedial actions may be taken in accordance with the ranking and possibly information related to the availability of resources for performing remedial actions. For example, remedial actions that utilize fewer computational resources may be performed for assets with comparatively lower risk scores if the amount of computational resources available for performing remedial actions in the enterprise system is low.

It should be appreciated that the various remedial actions described above are presented by way of example only, and that embodiments are not limited to use with these specific examples of remedial actions.

There have been many cases where stolen credentials have led to significant compromise of an enterprise system (e.g., including critical business or other assets of the enterprise system). As one example, the 2015 Office of Personnel Management (OPM) breach resulting from a Chinese spear-phishing attack resulted in 4 million SF-86 forms and fingerprints being stolen. An enterprise network may use encryption to store data, protect enterprise resources and assets behind firewalls, and use various other measures to harden the security of enterprise systems. One fundamental weakness in enterprise systems, however, is the users of such systems. Some estimates indicated that 80% of penetrations and hacks of cyber systems may start with a social engineering attack. Once user credentials have been compromised, for example, an adversary can obtain access to the enterprise network. The stolen credentials and known credential hopping techniques (e.g., pass-the-hash, password-harvesting tools, etc.) are used to harvest additional credentials and to eventually gain unauthorized access to critical resources and other assets of the enterprise system. Critical resources and assets in an enterprise system include but are not limited to: servers that store and maintain personally identifiable information (PII); intellectual property; source code repositories; engineering plans; financial transactions; medical records; etc.

An enterprise system may utilize various techniques for the detection of security threats such as spear-phishing, compromised accounts, etc. Some embodiments, however, assume that someone's credentials will be stolen and focus on techniques for estimating the risk due to resulting compromise of resources and other assets in the enterprise system. In this way, embodiments can identify and prioritize security hardening procedures and other remedial actions for mitigating such risk. In some embodiments, a User-Authentication graph is utilized.

Figure 3:
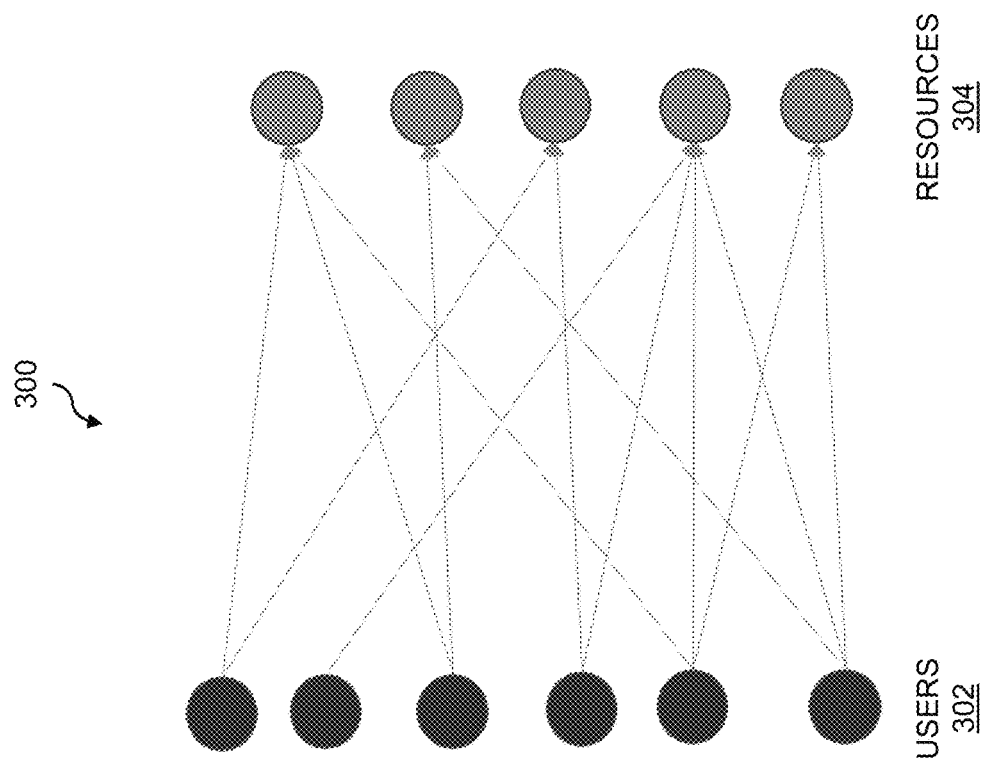
FIG. 3 shows a user-authentication graph for user authentication events in an enterprise system in an illustrative embodiment.

FIG. 3 shows an example of a User-Authentication graph 300, which is a bipartite graph whose nodes are partitioned onto two disjoint sets. In the FIG. 3 example, the User-Authentication graph 300 is split into the set of users 302 and the set of resources or assets 304 of an enterprise system. Each authentication event in an enterprise system defines an edge from one of the user nodes 302 to a corresponding resource node 304 (e.g., representing a machine or other asset in the enterprise system). The User-Authentication graph 300 may be built using login and other authentication events obtained from various system logs that are available on servers, machines and other assets of the enterprise system. Some embodiments assume that access to authentication events of various types are available and that a User-Authentication graph such as graph 300 shown in FIG. 3 is built.

User-Authentication graphs may be analyzed and utilized in a number of application areas, including: detecting similarity between users based on their access patterns (e.g., number of edges, structure of adjacency lists, etc.) and to identify clusters of users; detecting similarity between servers based on user's access patterns and to identify clusters of machines; classifying users' activities as malicious or not based on successful and failed authentication events; classifying servers, machines and other types of resources or assets as compromised based on the nature and success of the authentication events; analyzing the overall structure of the User-Authentication graph by comparing it to Erdős-Rényi random graph model to estimate risk; etc.

Other types of security analysis of an enterprise system may be based on studying the traffic patterns using packet capture and sniffing devices to build a connection graph of the enterprise system. Shortest paths and all-pairs shortest paths algorithms, for example, may be used to analyze network and traffic connectivity to derive enterprise risk related to configuration of the enterprise system (e.g., of an enterprise network) and low-level physical traffic patterns.

In some embodiments, it is assumed that an adversary will steal a user's credential to gain initial access to an arbitrary user account on the network of an enterprise system. The structure of the User-Authentication graph for the enterprise system is used to model the possible spread of compromise in the network by the adversary, such as using a random walk on the User-Authentication graph. Advantageously, some embodiments combine probabilistic analysis of the structure of the User-Authentication graph and a distribution of risk on the resources or assets of an enterprise system to derive risk measures for individual resources or assets, sets of resources or assets, or the enterprise system as a whole.

In some embodiments, approaches for estimating risk (e.g., resource or asset risk, enterprise system risk, etc.) exhibit the following characteristics:

(1) Graph-theoretic analysis of the User-Authentication graph is used to estimate the stationary distribution of a random walk in the User-Authentication graph. The stationary distribution is used to calculate the likelihood that assets will be compromised after an arbitrary user's account credentials are stolen.

(2) Asset criticalities are used to calculate a distribution of the business or enterprise importance on assets.

(3) The temporal variability of the asset criticalities is factored into account during risk estimation. Temporal variability of asset criticalities means that importance of each asset to the enterprise system is not necessarily constant and may be a function of time. For example, a billing server might be critical during the end of the month when billing statements are evaluated and less so at the beginning of the month. As another example, an online ordering server may be more critical to the business during sales periods (e.g., holiday sales such as Christmas and Labor Day sales) than other periods of time.

(4) The estimated likelihood of the assets being compromised from (1) is combined with the importance of the asset to the enterprise system calculated in (2) and (3) to derive risk scores for assets and a risk score for the enterprise system as a whole.

The computed risk scores are probabilistic because the graph-theoretic analysis performed in (1) is probabilistic. In terms of a Factor Analysis of Information Risk framework, some embodiments assume a threat community, a loss event frequency, a threat capability and a control strength. The threat community is assumed to include, by way of example, an adversary with access to email, an adversary with knowledge of password harvesting tools (e.g., mimikatz) that is able to utilize pass-the-hash attacks, and an adversary with knowledge of hacking tools and keylogging abilities to harvest credentials once access is gained to a particular resource or asset (e.g., a server, workstation, etc.) of the enterprise system.

Loss event frequency may be assumed to be very high. Sending a phishing or spear-phishing email, for example, takes no or minimal effort and the cost to a knowledgeable adversary (e.g., a nation-state) is zero or close, therefore the loss event frequency may be assumed to be very high. Threat capability may also be assumed to be moderate or high. Password harvesting tools, for example, are readily available. An adversary with the ability to utilize hacking and keylogging tools at servers and other assets that may be monitored does require some skills. Combining these, therefore, the threat capability may be moderate or high.

In some embodiments, two types of assets (e.g., users and resources) are considered with respect to control strength. Some embodiments assume that users are the weakest link in cyber security. Even though some users may be trained to recognize spam and credential spear-phishing emails, based on recent data user and asset control strength may be considered moderate. The control strength of human users may be considered low, and the probability of a successful credential compromise attack over an entire enterprise system may be assumed to be 1. Stealing and harvesting additional passwords after compromise of one or more users or user accounts requires a capable adversary, but tools such as mimikatz are readily available for use by adversaries. Thus, the probability of a successful credential hopping is also assumed to be moderate in some embodiments.

To enable graph-theoretic analysis, some embodiments assume that credential breach will happen and an adversary will obtain access to the internal network of the enterprise system. Some embodiments also assume that it is possible to harvest credentials of users that have logged on a given resource. The stolen credentials can be used to reach and compromise additional resources on the network of the enterprise system. A probabilistic risk for enterprise resources or assets is computed that takes into account: the reachability of enterprise's resources in a graph induced by login and other types of authentication events (e.g., entitlements from entitlement graphs indicating where users or user accounts can login); the importance or criticality of the resource or asset to the enterprise system; and the temporal variability of the resource or asset criticality.

The techniques described herein provide advantages in a number of use case scenarios covering wide-ranging consequences to risk and associated security processes of an enterprise system. One use case scenario is to utilize the insights into identity risk to streamline attack investigation as part of a Security Incident Response process. Understanding the chain of systems and potential path of an attacker's traversal utilizing stolen credentials would be a major benefit to such investigations. Additionally, understanding the more "likely" paths using the probabilistic model would help focus forensic analysis on critical systems, systems that have a higher likelihood of compromise due to the nature of the credentials, and combinations thereof.

Another use case scenario is utilizing the identification of the risk of individual resources or assets to adjust and prioritize monitoring, security hardening procedures and other types of remedial actions. Systems with high criticality and high identity risks, for example, could be prioritized for monitoring or routine security reviews. Additionally, configuration management, vulnerability management, access control reviews and other security processes could use this information to ensure preventive measures are in place to reduce risk.

A further use case scenario involves utilizing information on the risk of individual resources or assets, users, or the enterprise system in integrated risk management processes of an enterprise system, such as internal audits, security audits, compliance audits, etc. In some embodiments, the output may be used to identify possible chains that could lead to a compromise, and any audit of critical systems or assets could take these scenarios into consideration during the scoping process. This approach could identify systems that normally might fall out of scope of an audit based on the higher identity risk.

Further, some embodiments utilize the asset, identity or enterprise risk to enhance the overall business context of assets of an enterprise system generally. Assets in the enterprise system, for example, can be ordered according to their associated risk scores and this order can be used to prioritize a variety of security, risk and compliance actions. This information could also be used to model potential changes to the enterprise system to optimize risk management. For example, an overall enterprise risk measure can be used to gauge how changes in the User-Authentication graph can change the overall risk posture of the enterprise system. The User-Authentication graph can be altered by removing or granting access of users to resources or assets in the enterprise system (e.g., via network segmentation and isolation). These changes may positively or negatively affect risk scores, with the changes being used as a quantitative measure of such structural changes to the enterprise system.

As noted above, some embodiments assume that authentication events across an enterprise system are gathered to build a User-Authentication graph. In the description below, the User-Authentication graph is referred to as an ERPG. In some cases, the ERPG may be disconnected and include a collection of connected components. To generate risk scores, the ERPG may be analyzed to identify the connected components thereof. Given ERPG G=(U, R, E), where U are the set of users in the enterprise system, R are the set of resources or assets (e.g., machines, servers, etc.) in the enterprise system, and E are the set of edges derived from the authentication events observed in the enterprise system.

The connected components of the ERPG and their probability of initial compromise may be determined as follows. An undirected version of the ERPG is constructed (e.g., a version of the ERPG which ignores the direction of the edges). A search algorithm (e.g., a DFS algorithm, a BFS algorithm, etc.) is run on the undirected ERPG to obtain the set of connected components starting at an arbitrary node $u \in U$. Let the connected components of G be $C_1, C_2, \ldots, C_k$, where $C_i=(U_i, R_i, E_i)$, $U_{i=1}^k U_i=U$, $U_{i=1}^k R_i=R$, $U_{i=1}^k E_i=E$, and the sets of users, resources and edges are mutually disjoint. For each component $C_i$, an estimate of the probability that the initial compromise of the enterprise system will happen in component $C_i$ is defined as $P_c(C_i)=|U_i|/|U|$.

After identifying the connected components of the ERPG and their probability of initial compromise, the likelihood that a resource r in component $C_i$ will be compromised is computed. In some embodiments, a random walk on each component is used to model the movement of an adversary throughout the resources. It is assumed that the adversary has compromised user u's credential and chooses at random to login to one of the machines or other assets that can successfully authenticate u. Once the adversary has reached resource q, for example, password hacking and harvesting tools may be used to obtain new credentials and to continue hopping around the component's resources using the acquired stolen credentials. The random walk on $C_i$ models the traversal of the nodes of $C_i$. In some embodiments, it is desired to know the long-term behavior of such a walk and the probability of nodes in the component upon convergence, which is expressed by the stationary distribution of a random walk on the graph.

The stationary distribution may be computed by converting the adjacency matrix of the graph to a probability transition matrix, denoted as M. The diagonal entries of M are set to ½, ensuring that the random walk is non-periodic and convergence is guaranteed. The entries in each row of the probability transition matrix M are normalized to add to 1. The random walk is simulated using the probability transition matrix M; the stationary distribution denoted as $\hat{\pi}$ satisfies the equation $\hat{\pi}M=\hat{\pi}$. Various algorithms may be used for computing the stationary distribution, including the PageRank algorithm.

It should be noted, however, that in many cases the probability a random walk reaches a resource might be biased due to other factors such as the existence of unpatched vulnerabilities and their severities, implementation of security controls, etc. These factors may significantly increase or decrease the possibility that the adversary can compromise a given resource and use it as a pivot for lateral movement in the network of the enterprise system. In order to take this into account, each resource $r_i$ is assigned with a score $v(r_i)$ that factors in it the prior knowledge of how vulnerable the resource is based on the above. The higher the score, the more vulnerable the device, resource or other asset is. With that, the power iterations algorithm used to calculate the stationary state of each component C (e.g., PageRank) is:

$$\pi'=\beta M\pi+(1-\beta)V; \pi \leftarrow \pi'$$

where M is the probability transition matrix, V is a unit vector that each of its entries is $v(r_i)$, and $\beta$ is a constant, which in some embodiments is set to a value in the range of 0.8 to 0.9. This addition reflects the fact that a vulnerable resource is more likely to be compromised than a resource that is fully patched and controlled, and will change the stationary state accordingly.

If no vulnerability assessment is known about the assets of the enterprise, then the update equation may be: $\pi'=M\pi$; $\pi \leftarrow \pi'$.

In some embodiments, the initial distribution on nodes is chosen to be uniform over all users $U_i$ of the enterprise, while the resources will be given probability 0. Upon convergence, the algorithm that computes the stationary distribution will output for every node $x \in U_i \cup R_i$ a stationary probability $\pi(x)$, such that the sum of those probabilities adds to 1. Note that the stationary distribution will include probabilities for all users and resources in the component. Let the sum of the probabilities of reaching all resources in the component be $S=\Sigma_{q \in R_i} \pi(q)$.

The likelihood of an adversary to reach resource $r \in R_i$ is defined as $p(r)=\pi(r)/S$ in some embodiments. Some embodiments further assume that if the adversary reaches resource r, then the adversary has compromised the resource. Let $\Pi$ be the vector of dimension $p=|R_i|$ (e.g., the number of resources in the component) of the normalized stationary probabilities, $\Pi=(p(r_1), \ldots, p(r_p))^T$.

Risk in an enterprise system may be distributed using asset criticalities or importance. Some resources or assets (e.g., servers, machines, etc.) in an enterprise system are of critical importance to the operation of the enterprise, while others might be important but not critical. In some embodiments, an enterprise may assign assets to different categories of criticality or importance. For example, an enterprise may have four different categories for resources or assets of different types: (i) category 1: not critical; (ii) category 2: higher criticality; (iii) category 3: high-importance resources or assets; and (iv) enterprise-critical resources or assets.

In some embodiments, it is assumed that resources or assets of an enterprise system are assigned criticality values proportional to their importance to the enterprise and the cost or loss of productivity or revenue that will result should the resource or asset be compromised. In the example above, every resource or asset in the enterprise system is assigned a value of 1, 2, 3, or 4 based on the category to which it belongs. The criticality values may be assigned by an administrator other authorized user of the enterprise system, may be determined automatically using an organizational chart of the enterprise, combinations thereof, etc. The criticality numbers for the assets of the enterprise are converted to a distribution of risk. Let $CR=(c_1, \ldots, c_p)$ be a vector of dimension $p=|R_i|$, where the $j^{th}$ component is the criticality category of resource $r_j$.

Temporal variability of the criticality of assets in the enterprise system, in some embodiments, is captured using the fraction of time that a resource or asset is critical. Consider a fixed length of time that captures the periodicity of the enterprise operation. For example, this can be a month, a quarter, or some other designated enterprise-dependent periodicity. Let $T=(t_1, \ldots, t_p)$ be a vector representing the fraction of time that each resource is critical, $t_k \in (0,1]$, $k=1 \ldots p$.

In some embodiments, the following functions are used to convert asset criticalities and the temporal variability thereof to a proper distribution $D=(d_1, \ldots, d_p)$: direct $$d_j = \frac{c_j \times t_j}{\sum c_k \times t_k};$$

and a softmax function:

$$d_j = \frac{e^{(c_j \times t_j)}}{\sum_{k=1}^{p} e^{(c_k \times t_k)}}.$$

Note that $\sum_{k=1}^{p} d_k = 1$. D is the vector of distribution of the temporal asset criticalities. In other embodiments, other transformations may be applied in order to convert the criticalities from ordinal variables to numerical variables. For example, binary transformation of criticality values 3 and 4 to be critical (1) and the rest to be non-critical (0) may be used, as well as applying other functions such as sigmoid or linear transformation.

The risk measure for a resource or asset may be computed as follows. Let $r_j$ be a resource or asset whose probability of compromise is computed as $p(r_j)$, and whose component in the vector of distribution of criticality is $d_j$. The risk of this resource or asset may be measured as $d_j \times p(r_j)$.

The risk measure of a component $C_i = (U_i, R_i, E_i)$ in some embodiments is computed as the dot product of the corresponding vectors of distribution of resource criticalities and vector of likelihood of resource compromise:

$$\text{Risk}(C_i) = \langle \Pi, D \rangle = D^T \Pi = \sum_{r_j \in R_i} d_j \times p(r_j).$$

The risk measure of the enterprise system as a whole may be computed as follows. If the ERPG graph G has only one component, then the risk of the enterprise system is the risk measure of that component as discussed above. If the ERPG has k components $C_1, C_2, \ldots, C_k$, then the risk of the enterprise system may be computed as the sum of the risks of its components:

$$\text{Risk}(G) = \sum_{m=1}^{k} P_c(C_i) \times \text{Risk}(C_i)$$

where $P_c(C_i)$ is computed as described above.

To simulate the random walk, an initial distribution on the nodes in the component is specified. In the description above, the initial distribution was specified by using a uniform distribution on users, while assigning 0 probability on resources or assets. In some embodiments, however, this distribution may be changed to start the random walk at a specific user or group of users (e.g., users that are part of a specific administrative group) while assigning 0 probability to the rest of the users. This might be useful if we have knowledge of the users who have failed, for example, various spear-phishing training and thus may be considered more likely to become a victim of such an attack.

In some embodiments, probabilities may be assigned to resources or asset in the initial distribution as well. Suppose that information regarding the vulnerability assessment of various resources or assets is available, and further suppose that based on the assessment some password and hacking tools might not be able to run on all machines. These pieces of knowledge may be used to assign different probabilities to different assets (e.g., different machines), such as those with different patch levels of software installed or other security hardening procedures applied thereto. The simulation of the random walk may thus take into account this vector, possibly along with a non-uniform initial distribution on users as described above.

In the discussion above, a model is assumed to express the time-dependent nature of asset criticalities by taking into account the fraction of time each asset is critical. Some embodiments may utilize different, more complex or sophisticated models that induce different graphs for different time deltas and analyze risk as a function of time.

In some embodiments, it is assumed that information for authentication events to each resource or asset in the enterprise system is collected (e.g., to build the ERPG graph). However, even without this explicit information the techniques described herein may be used by leveraging resource or asset and user metadata to implicitly derive the probability that users will login to a resource or asset. For example, one can use data about the business unit that each resource or asset belongs to and its geographic location, and assume that all users in that business unit and geographic location can and will login to that resource with uniform probability. Various other examples are possible.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for risk score generation for assets in an enterprise system utilizing user authentication activity will now be described in greater detail with reference to FIGS. 4 and 5. Although described in the context of system 100, these platforms may also be used to implement at least portions of other information processing systems in other embodiments.

Figure 4:
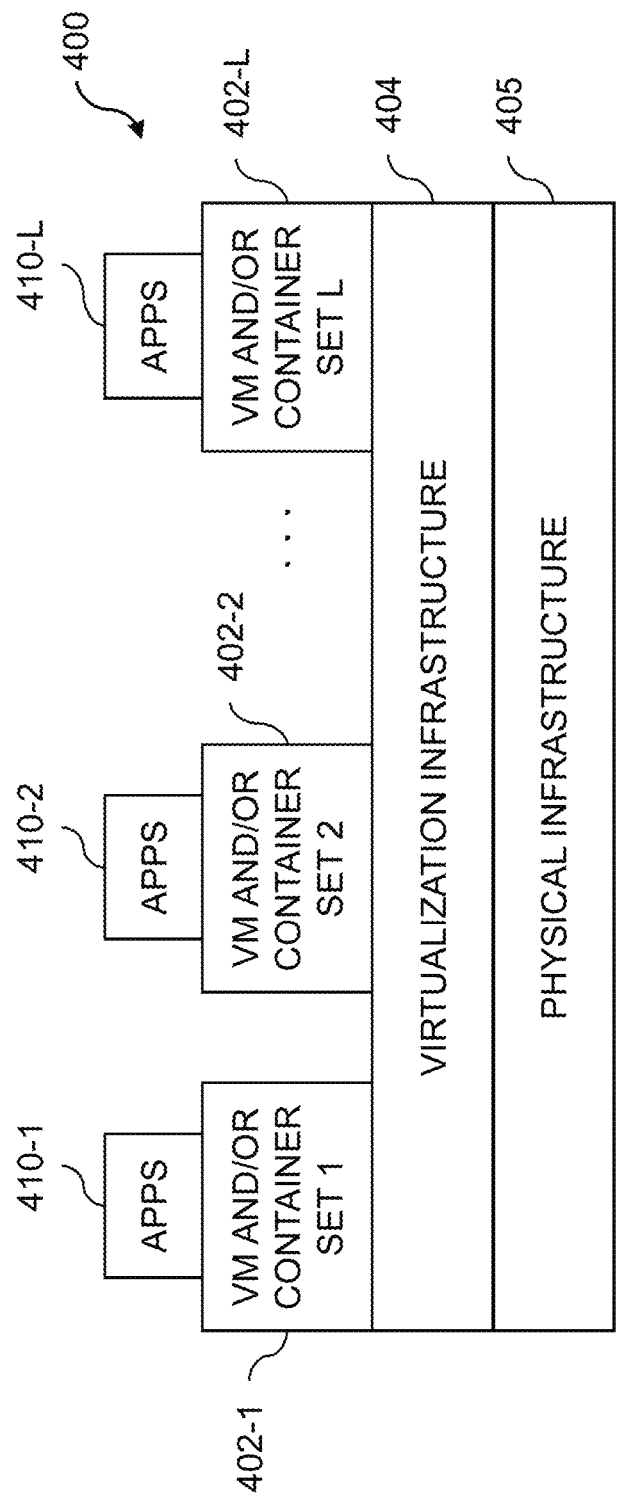

FIG. 4 shows an example processing platform comprising cloud infrastructure 400. The cloud infrastructure 400 comprises a combination of physical and virtual processing resources that may be utilized to implement at least a portion of the information processing system 100. The cloud infrastructure 400 comprises multiple virtual machines (VMs) and/or container sets 402-1, 402-2, . . . 402-L implemented using virtualization infrastructure 404. The virtualization infrastructure 404 runs on physical infrastructure 405, and illustratively comprises one or more hypervisors and/or operating system level virtualization infrastructure. The operating system level virtualization infrastructure illustratively comprises kernel control groups of a Linux operating system or other type of operating system.

The cloud infrastructure 400 further comprises sets of applications 410-1, 410-2, . . . 410-L running on respective ones of the VMs/container sets 402-1, 402-2, . . . 402-L under the control of the virtualization infrastructure 404. The VMs/container sets 402 may comprise respective VMs, respective sets of one or more containers, or respective sets of one or more containers running in VMs.

In some implementations of the FIG. 4 embodiment, the VMs/container sets 402 comprise respective VMs implemented using virtualization infrastructure 404 that comprises at least one hypervisor. An example of a hypervisor platform that may be used to implement a hypervisor within the virtualization infrastructure 404 is the VMware® vSphere® which may have an associated virtual infrastructure management system such as the VMware® vCenter™. The underlying physical machines may comprise one or more distributed processing platforms that include one or more storage systems.

In other implementations of the FIG. 4 embodiment, the VMs/container sets 402 comprise respective containers implemented using virtualization infrastructure 404 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 400 shown in FIG. 4 may represent at least a portion of one processing platform. Another example of such a processing platform is processing platform 500 shown in FIG. 5.

The processing platform 500 in this embodiment comprises a portion of system 100 and includes a plurality of processing devices, denoted 502-1, 502-2, 502-3, . . . 502-K, which communicate with one another over a network 504.

The network 504 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 502-1 in the processing platform 500 comprises a processor 510 coupled to a memory 512.

The processor 510 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 512 may comprise random access memory (RAM), read-only memory (ROM), flash memory or other types of memory, in any combination. The memory 512 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 502-1 is network interface circuitry 514, which is used to interface the processing device with the network 504 and other system components, and may comprise conventional transceivers.

The other processing devices 502 of the processing platform 500 are assumed to be configured in a manner similar to that shown for processing device 502-1 in the figure.

Again, the particular processing platform 500 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure such as VxRail™, VxRack™, VxRack™ FLEX, VxBlock™, or Vblock® converged infrastructure from Dell EMC.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for risk score generation for assets in an enterprise system utilizing user authentication activity as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, enterprise systems, assets, types of user authentication activities, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method comprising:
obtaining information regarding a set of authentication events for an enterprise system, a given authentication event being associated with at least one of a plurality of users of the enterprise system accessing at least one of a plurality of assets of the enterprise system;
determining a likelihood of a given one of the plurality of assets of the enterprise system becoming compromised responsive to compromise of a given one of the plurality of users of the enterprise system, the given asset comprising at least one of a physical computing resource and a virtual computing resource in the enterprise system;
determining an importance of the given asset of the enterprise system based at least in part on a criticality value associated with the given asset;
generating a risk score for the given asset based at least in part on: (i) the determined likelihood of the given asset becoming compromised responsive to compromise of the given user; and (ii) the determined importance of the given asset;
identifying one or more remedial actions to reduce the risk score for the given asset; and
implementing, prior to detecting compromise of the given user, at least one of the remedial actions to modify a configuration of the given asset;
wherein the method is performed by at least one processing device comprising a processor coupled to a memory.

2. The method of claim 1 wherein the given authentication event comprises at least one of:
authenticating the at least one user to verify an identity of the at least one user; and
authorizing access by the at least one user to verify that the at least one user has permission to access the at least one asset utilizing one or more entitlements of the at least one user.

3. The method of claim 1 obtaining the information regarding the set of authentication events comprises deriving probabilities that a selected one of the plurality of users of the enterprise system will access a selected one of the plurality of assets of the enterprise system utilizing metadata associated with a placement of the selected user in an organizational structure of the enterprise system and metadata associated with a location of the selected asset of the enterprise system.

4. The method of claim 1 wherein obtaining the set of authentication events comprises generating an enterprise risk propagation graph comprising a bipartite graph with a first portion comprising a first plurality of nodes representing respective ones of the plurality of users of the enterprise system and a second portion comprising a second plurality of nodes representing respective ones of the plurality of assets of the enterprise system, the first and second pluralities of nodes being connected by a plurality of edges representing the obtained authentication events.

5. The method of claim 4 wherein generating the enterprise risk propagation graph comprises:
constructing an undirected version of the bipartite graph with non-directional edges connecting the first plurality of nodes to the second plurality of nodes based on the obtained authentication events for the enterprise system; and
performing a search on the undirected version of the bipartite graph to obtain a set of connected components connecting a given one of the first plurality of nodes representing the given user to a subset of the first and second pluralities of nodes.

6. The method of claim 5 wherein performing the search comprises performing at least one of a depth-first search and a breadth-first search on the undirected version of the bipartite graph to obtain the set of connected components for the given one of the first plurality of nodes representing the given user.

7. The method of claim 4 wherein determining the likelihood of the given asset becoming compromised responsive to compromise of the given user comprises utilizing a random walk algorithm starting at a given one of the first plurality of nodes representing the given user and traversing a subset of the second plurality of nodes until a given one of the second plurality of nodes representing the given asset is reached.

8. The method of claim 7 wherein the random walk algorithm utilizes a decay factor that reduces a probability of reaching a selected one of the second plurality of nodes based on a number of edges of the enterprise risk propagation graph traversed to reach the selected one of the second plurality of nodes from the given one of the first plurality of nodes.

9. The method of claim 7 wherein the random walk algorithm comprises:
converting an adjacency matrix of the enterprise risk propagation graph to a probability transition matrix, wherein diagonal entries of the probability transition matrix are set to a predetermined value ensuring that a random walk of the enterprise risk propagation graph is non-periodic and converges and wherein entries in each of the rows of the probability transition matrix are normalized to sum to one; and
simulating the random walk of the enterprise risk propagation graph utilizing a stationary distribution of the enterprise risk propagation graph and the probability transition matrix.

10. The method of claim 9 wherein the stationary distribution is computed utilizing a link analysis algorithm that assigns a numerical weighting to each of the plurality of edges of the enterprise risk propagation graph.

11. The method of claim 10 wherein the numerical weighting assigned to a given one of the plurality of edges connecting to a selected one of the plurality of assets is based at least in part on a determined vulnerability of the selected asset.

12. The method of claim 7 wherein the random walk algorithm utilizes an initial distribution of the enterprise risk propagation graph comprising a uniform distribution of the first plurality of nodes and wherein the second plurality of nodes are assigned a zero probability.

13. The method of claim 7 wherein the random walk algorithm utilizes an initial distribution of the enterprise risk propagation graph comprising a non-uniform distribution wherein a subset of the first plurality of nodes representing a subset of the plurality of users of the enterprise system are assigned non-zero probability and a remainder of the first plurality of nodes are assigned zero probability.

14. The method of claim 7 wherein the random walk algorithm utilizes an initial distribution of the enterprise risk propagation graph comprising a non-uniform distribution of the second plurality of nodes wherein probabilities assigned to the second plurality of nodes are based on vulnerability assessments of the plurality of assets of the enterprise system.

15. The method of claim 1 wherein the determined importance of the given asset is further based at least in part on a temporal variability in the criticality of the given asset, the temporal variability being determined based at least in part on a fraction of time within a designated time period that the given asset is assigned a given criticality value.

16. The method of claim 1 further comprising generating a risk score for the enterprise system based at least in part on the generated risk score for the given asset and one or more additional risk scores generated for additional ones of a plurality of assets of the enterprise system, each additional risk score being generated based on a determined likelihood of the corresponding asset becoming compromised responsive to compromise of the given user and a determined importance of the corresponding asset of the enterprise system.

17. A computer program product comprising a non-transitory processor-readable storage medium having stored therein program code of one or more software programs, wherein the program code when executed by at least one processing device causes the at least one processing device:
to obtain information regarding a set of authentication events for an enterprise system, a given authentication event being associated with at least one of a plurality of users of the enterprise system accessing at least one of a plurality of assets of the enterprise system;
to determine a likelihood of a given one of the plurality of assets of the enterprise system becoming compromised responsive to compromise of a given one of the plurality of users of the enterprise system, the given asset comprising at least one of a physical computing resource and a virtual computing resource in the enterprise system;
to determine an importance of the given asset of the enterprise system based at least in part on a criticality value associated with the given asset;
to generate a risk score for the given asset based at least in part on: (i) the determined likelihood of the given asset becoming compromised responsive to compromise of the given user; and (ii) the determined importance of the given asset;
to identify one or more remedial actions to reduce the risk score for the given asset; and
to implement, prior to detecting compromise of the given user, at least one of the remedial actions to modify a configuration of the given asset.

18. The computer program product of claim 17 wherein obtaining the information regarding the set of authentication events comprises generating an enterprise risk propagation graph comprising a bipartite graph with a first portion comprising a first plurality of nodes representing respective ones of the plurality of users of the enterprise system and a second portion comprising a second plurality of nodes representing respective ones of the plurality of assets of the enterprise system, the first and second pluralities of nodes being connected by a plurality of edges representing the obtained authentication events.

19. An apparatus comprising: at least one processing device comprising a processor and a memory, the processor coupled to the memory; the at least one processing device being configured to:
obtain information regarding a set of authentication events for an enterprise system, a given authentication event being associated with at least one of a plurality of users of the enterprise system accessing at least one of a plurality of assets of the enterprise system;
determine a likelihood of a given one of the plurality of assets of the enterprise system becoming compromised responsive to compromise of a given one of the plurality of users of the enterprise system, the given asset comprising at least one of a physical computing resource and a virtual computing resource in the enterprise system;
determine an importance of the given asset of the enterprise system based at least in part on a criticality value associated with the given asset;
generate a risk score for the given asset based at least in part on: (i) the determined likelihood of the given asset becoming compromised responsive to compromise of the given user; and (ii) the determined importance of the given asset;
identify one or more remedial actions to reduce the risk score for the given asset; and
implement, prior to detecting compromise of the given user, at least one of the remedial actions to modify a configuration of the given asset.

20. The apparatus of claim 19 wherein obtain the information regarding the set of authentication events comprises generating an enterprise risk propagation graph comprising a bipartite graph with a first portion comprising a first plurality of nodes representing respective ones of the plurality of users of the enterprise system and a second portion comprising a second plurality of nodes representing respective ones of the plurality of assets of the enterprise system, the first and second pluralities of nodes being connected by a plurality of edges representing the obtained authentication events.

* * * * *